United States Patent
Hochi

(10) Patent No.: US 7,666,937 B2
(45) Date of Patent: Feb. 23, 2010

(54) RUBBER COMPOSITION FOR SIDE REINFORCEMENT AND RUN FLAT TIRE USING THE SAME

(75) Inventor: Kazuo Hochi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 331 days.

(21) Appl. No.: 11/496,569

(22) Filed: Aug. 1, 2006

(65) Prior Publication Data

US 2007/0049681 A1    Mar. 1, 2007

(30) Foreign Application Priority Data

Aug. 23, 2005    (JP) .............................. 2005-241509

(51) Int. Cl.
C09C 1/42 (2006.01)
B60C 17/00 (2006.01)
C08K 5/00 (2006.01)
C08K 3/30 (2006.01)

(52) U.S. Cl. ....................... 524/447; 152/516; 524/236; 524/418

(58) Field of Classification Search ................. 524/447, 524/236, 418; 152/516
See application file for complete search history.

(56) References Cited

U.S. PATENT DOCUMENTS

| | | | |
|---|---|---|---|
| 6,699,921 B2 * | 3/2004 | Ikeda ........................ | 524/236 |
| 2002/0091184 A1 | 7/2002 | Ikeda | |
| 2002/0151636 A1 * | 10/2002 | Wada et al. ................. | 524/445 |
| 2003/0098439 A1 * | 5/2003 | Ishibashi et al. ............. | 252/73 |
| 2005/0182178 A1 * | 8/2005 | Hochi ........................ | 524/447 |

FOREIGN PATENT DOCUMENTS

| | | |
|---|---|---|
| EP | 1 564 031 A1 | 8/2005 |
| EP | 1 582 561 A1 | 10/2005 |
| EP | 1 707 595 A1 | 10/2006 |
| JP | 54106990 * | 8/1979 |
| JP | 60-137946 A | 7/1985 |
| JP | 9-316256 A | 12/1997 |
| JP | 11-348513 A | 12/1999 |
| JP | 2003-292685 A | 10/2003 |
| JP | 2005-126472 A | 5/2005 |

OTHER PUBLICATIONS

Database WPI, Week 200539, Derwent Publications Ltd., London, GB; AN 2005-376718, (May 19, 2005). XP002404057.
Database WPI, Week 199808, Derwent Publications Ltd., London, GB; AN 1998-082787, (Dec. 9, 1997). XP002404151.
Database WPI, Week 198535, Derwent Publications Ltd., London, GB; AN 1985-214365, (Jul. 22, 1985). XP002404152.

* cited by examiner

*Primary Examiner*—Ling-Siu Choi
*Assistant Examiner*—Hui Chin
(74) *Attorney, Agent, or Firm*—Birch, Stewart, Kolasch & Birch, LLP

(57) ABSTRACT

A rubber composition for reinforcing a side having both low exothermic property and high hardness is provided.
The invention relates to a rubber composition for reinforcing a side of a run flat tire, comprising 10 to 100 parts by weight of carbon black having a nitrogen adsorbing-specific area of 30 to 100 m²/g and a dibutyl phthalate oil absorption amount of at least 50 ml/100 g, at least 2 parts by weight of sulfur or a sulfur compound, and 5 to 120 parts by weight of (1) a lamellar alumina powder or (2) fluorine-containing mica having an aspect ratio of 3 to 50 based on 100 parts by weight of a diene rubber component.

9 Claims, 1 Drawing Sheet

RUBBER COMPOSITION FOR SIDE REINFORCEMENT AND RUN FLAT TIRE USING THE SAME

BACKGROUND OF THE INVENTION

The present invention relates to a rubber composition for side reinforcement excellent in run flat performance and a run flat tire using the same.

At present, a run flat tire having a side reinforcing layer with high hardness arranged at the inside of a side wall part is practically used and a vehicle can run for a certain distance even if an air pressure is lost by puncture. Thereby, there is no necessity to always have a spare tire ready, and it can be expected that the weight of the whole vehicle is decreased.

However, there are limitations on speed and distance for run flat running with a puncture of a run flat tire. Therefore, a further improvement in durability of the run flat tire is desired.

As effective means for improving durability of the run flat tire, an example is a method of suppressing deformation by thickening reinforcing rubber and preventing fracture by the deformation. However, since the tire weight is increased, this goes against weight decrease which is the initial purpose of the run flat tire.

Further, as effective means for improving durability of the run flat tire, am example is a method of increasing a weight of a filler for reinforcement such as carbon black and enhancing the hardness of a reinforcing rubber by compounding the filler to suppress deformation. However, since the load in the steps of kneading, extrusion and the like is large, and the exothermic properties after vulcanization are increased, improvement in durability of the run flat tire cannot be largely expected.

Further, as effective means for improving durability of the run flat tire, an example is a method of increasing a vulcanization density by using a large amount of a vulcanizer and a vulcanization accelerator without increasing the amount of carbon black and suppressing deformation and heat generation (for example, the JP-A-2002-155169). However, elongation of the rubber is lessened, and strength at break is lowered.

On the other hand, it is proposed that improvement in air permeability resistance and appearance is developed by compounding a rubber for a sidewall of a pneumatic tire with natural lamellar mineral such as micas (for example, JP-A-2003-292685 and JP-A-11-348513). However, since such rubber is required to have bending resistance performance, the hardness thereof is low. Therefore, there has been a problem that such rubber has inadequate hardness for being used as a rubber for reinforcing the side of the run flat tire to sustain the load at a low inner pressure.

SUMMARY OF THE INVENTION

An object of the present invention is to provide a rubber composition for reinforcing a side of a run flat tire having a low exothermic property as well as high hardness.

The present invention relates to a rubber composition for reinforcing a side of a run flat tire, comprising 10 to 100 parts by weight of carbon black having a nitrogen adsorbing-specific area of 30 to 100 m$^2$/g and a dibutyl phthalate oil absorption amount of at least 50 ml/100 g, at least 2 parts by weight of sulfur or a sulfur compound, and 5 to 120 parts by weight of (1) a lamellar alumina powder or (2) fluorine-containing mica having an aspect ratio of 3 to 50 based on 100 parts by weight of a diene rubber component.

DETAILED DESCRIPTION

Figure 1:
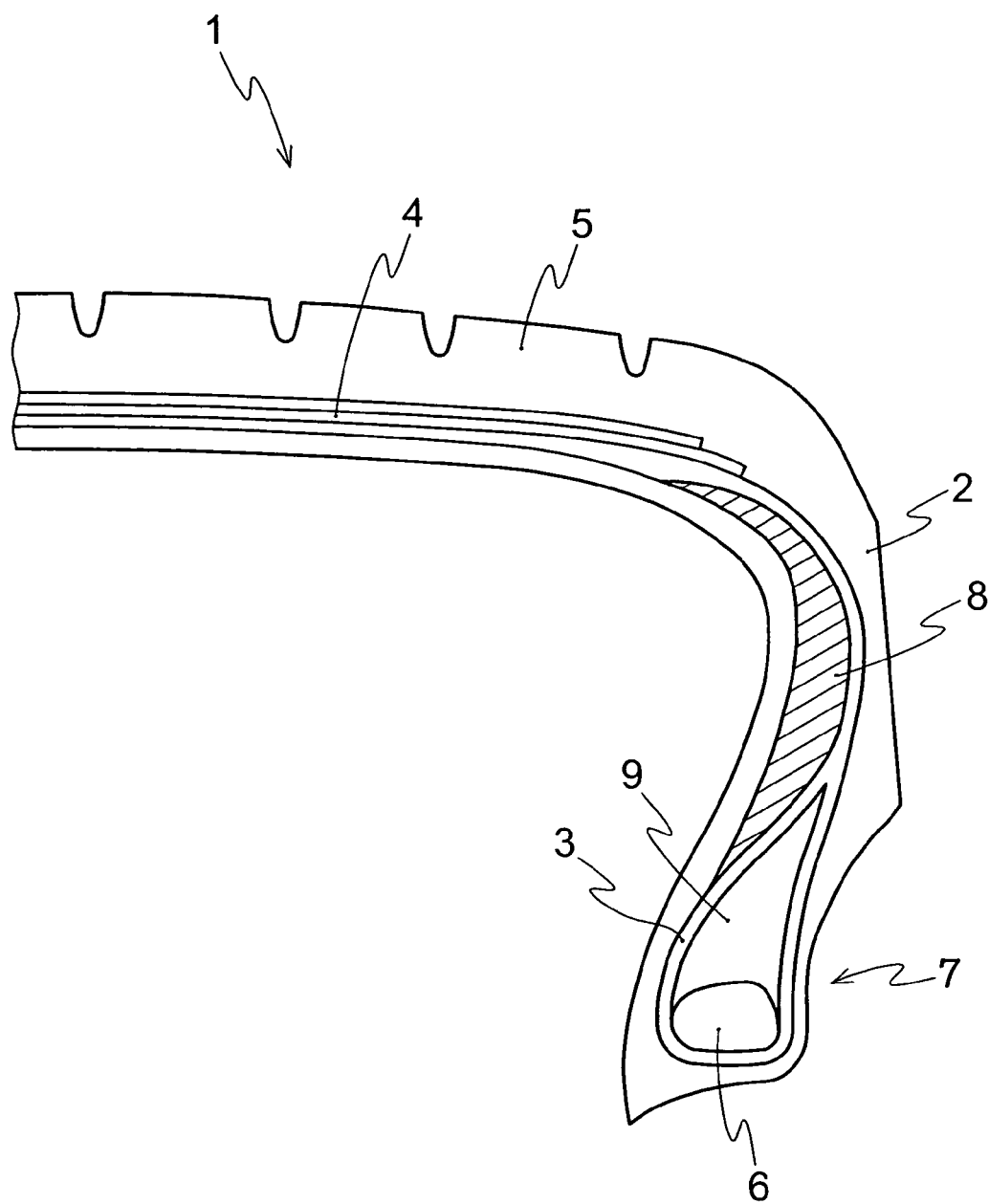
FIG. 1 is a right half of a sectional view of a run flat tire according to one embodiment of the present invention.

The rubber composition for side reinforcement of the present invention comprises a diene rubber component, carbon black, either one of (1) a lamellar alumina powder and (2) fluorine-containing mica, and sulfur or a sulfur compound. The rubber composition for side reinforcement of the present invention is used for a side reinforcing layer of the run flat tire. As shown in FIG. 1 representing the sectional view of the run flat tire, the side reinforcing layer 8 indicates a lining strip layer which is brought in contact with the inside of a tire carcass ply 3, arranged from a bead part 7 to a shoulder part and arranged in a lunate shape which gradually decreases its thickness toward the directions of the both ends. The side reinforcing layer 8 can support a vehicle in a state where an air pressure is lost by existence of the side reinforcing layer in the run flat tire, thereby can provide excellent run flat durability.

Examples of the diene rubber component are a natural rubber (NR), a butadiene rubber (BR), a syndiotactic-1,2-polybutadiene (1,2-BR), a styrene-butadiene copolymer rubber (SBR), an isoprene rubber (IR), an acrylonitrile-butadiene copolymer rubber (NBR), a chloroprene rubber (CR), a styrene-isoprene-butadiene copolymer rubber (SIBR), a styrene-isoprene copolymer rubber, and an isoprene-butadiene copolymer rubber.

As the diene rubber component other than the above, it is preferable to use a diene rubber containing a syndiotactic-1,2-polybutadiene (an SPB-containing diene rubber). As the SPB-containing diene rubber, for example, a butadiene rubber containing syndiotactic-1,2-polybutadienes such as VCR-303, 412 and 617 available from Ube Industries, Ltd. can be used.

The above-mentioned diene rubber component may be used alone or at least 2 kinds thereof may be used in combination.

The amount ratio of BR in the diene rubber component is preferably at least 20% by weight. When the amount ratio of BR is less than 20% by weight, exothermic property tends to be increased. Further, the amount ratio is preferably at most 80% by weight in the rubber component, and more preferably at most 60% by weight. When BR exceeds 80% by weight, rubber hardness tends to be lowered.

The nitrogen adsorbing-specific surface area (N$_2$SA) of carbon black is at least 30 m$^2$/g and preferably at least 35 m$^2$/g. When the N$_2$SA is less than 30 m$^2$/g, reinforcing property is in short, and adequate durability is not obtained. Further, the N$_2$SA of carbon black is at most 100 m$^2$/g, preferably at most 80 m$^2$/g, and more preferably at most 60 m$^2$/g. When the N$_2$SA exceeds 100 m$^2$/g, the rubber composition easily generates heat.

A dibutyl phthalate oil absorption amount (DBP oil absorption amount) of carbon black is at least 50 ml/100 g and preferably at least 80 ml/100 g. When the DBP oil absorption amount is less than 50 ml/100 g, it is difficult to obtain adequate reinforcing property.

An amount of carbon black is at least 10 parts by weight based on 100 parts by weight of the diene rubber component, preferably at least 20 parts by weight, and more preferably at least 30 parts by weight. When carbon black is less than 10 parts by weight, adequate rubber strength is not obtained. Further, the amount of carbon black is at most 100 parts by weight, preferably at most 70 parts by weight and more preferably at most 60 parts by weight. When the carbon black exceeds 100 parts by weight, compounding viscosity is increased and the kneading and extrusion of the rubber becomes difficult.

The rubber composition for side reinforcement of the present invention contains either of (1) a lamellar alumina powder or (2) fluorine-containing mica.

The lamellar alumina powder (1) is preferably those synthesized by a preparation process such as a hydrothermal synthesis since the particle size distribution thereof is very sharp.

An aspect ratio of the lamellar alumina powder (1) is at least 3, preferably at least 5, and more preferably at least 10. When the aspect ratio is less than 3, adequate rubber hardness is not obtained. Further, the aspect ratio of the lamellar alumina powder (1) is at most 50 and preferably at most 40. When the aspect ratio exceeds 50, dispersion into the rubber is lowered, and strength at break is lowered. The aspect ratio of the lamellar alumina powder (1) is obtained by arbitrarily selecting 50 particles from the lamellar alumina powder (1) obtained by combusting the rubber composition and the like by using an electron microscope and calculating a ratio of the maximum diameter based on a thickness using the average thickness and average maximum diameter obtained by measuring the particles.

An average particle diameter of the lamellar alumina powder (1) is preferably at least 2 μm, more preferably at least 5 μm, and further preferably at least 10 μm. When the average particle diameter is less than 2 μm, adequate rubber hardness does not tend to be obtained. Further, the average particle diameter of the lamellar alumina powder (1) is preferably at most 30 μm and more preferably at most 20 μm. When the average particle diameter exceeds 30 μm, fatigue resistance performance is lowered and run flat property tends to be lowered. The average particle diameter indicates an average value of longer diameters.

An amount of the lamellar alumina powder (1) is at least 5 parts by weight based on 100 parts by weight of the diene rubber component, preferably at least 10 parts by weight, and particularly preferably at least 15 parts by weight. When the amount is less than 5 parts by weight, effect obtained by compounding the lamellar alumina powder (1) is not adequately obtained. Further, the amount of the lamellar alumina powder (1) is at most 120 parts by weight, preferably at most 80 parts by weight, and particularly preferably at most 60 parts by weight. When the amount exceeds 120 parts by weight, besides dispersion into the rubber becomes difficult, heat generation is easily caused.

The fluorine-containing mica (2) is preferably represented by the following formula:

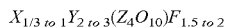

$$X_{1/3\ to\ 1}Y_{2\ to\ 3}(Z_4O_{10})F_{1.5\ to\ 2}$$

(wherein X represents one kind of ion selected from the group consisting of $Na^+$, $K^+$, $Li^+$, $Ca^{2+}$, $Rb^{2+}$ and $Sr^{2+}$, Y represents one kind of ion selected from the group consisting of $Mg^{2+}$, $Fe^{2+}$, $Ni^{2+}$, $Mn^{2+}$, $Al^{3+}$, $Fe^{3+}$ and $Li^+$, and Z represents one kind of ion selected from the group consisting of $Al^{3+}$, $Si^{4+}$, $Ce^{4+}$, $Fe^{3+}$ and $B^{3+}$).

As the fluorine-containing mica (2), any one of $KMg_3AlSiO_3O_{10}F_2$, $KMg_{2.5}Si_4O_{10}F_2$, $NaMg_{2.5}Si_4O_{10}F_2$, $NaMg_2LiSi_4O_{10}F_2$ and $LiMg_2LiSi_4O_{10}F_2$ is preferable in particular.

Further, since particle size distribution is very sharp, the fluorine-containing mica (2) is preferably synthesized by a preparation process such as an inner heat melting process and an outer heat melting process. The fluorine-containing mica (2) can impart an effect of improving heat resistance property by containing fluorine.

The aspect ratio of the fluorine-containing mica (2) is at least 3, preferably at least 5, and more preferably at least 10. When the aspect ratio is less than 3, adequate rubber hardness is not obtained. Further, the aspect ratio of the fluorine-containing mica (2) is at most 50, preferably at most 40, more preferably at most 30 and further preferably at most 20. When the aspect ratio exceeds 50, dispersion into the rubber is lowered, and strength at break is lowered. The aspect ratio of the fluorine-containing mica (2) is obtained by arbitrarily selecting 50 particles from the fluorine-containing mica (2) obtained by combusting the rubber composition and the like by using an electron microscope and calculating a ratio of the maximum diameter based on a thickness using the average thickness and average maximum diameter obtained by measuring the particles.

The average particle diameter of the fluorine-containing mica (2) is preferably at least 2 μm, more preferably at least 5 μm, and further preferably at least 10 μm. When the average particle diameter is less than 2 μm, besides the cost thereof is increased for pulverization, adequate rubber hardness does not tend to be obtained. Further, the average particle diameter of the fluorine-containing mica (2) is preferably at most 30 μm, and more preferably at most 20 μm. When the average particle diameter exceeds 30 μm, the fluorine-containing mica (2) may cause fracture and fatigue resistance performance tends to be lowered. The average particle diameter indicates an average value of longer diameters.

An amount of the fluorine-containing mica (2) is at least 5 parts by weight based on 100 parts by weight of the diene rubber component, preferably at least 10 parts by weight, and more preferably at least 15 parts by weight. When the amount is less than 5 parts by weight, an effect obtained by compounding the fluorine-containing mica (2) is not adequately obtained. Further, the amount of the fluorine-containing mica (2) is at most 120 parts by weight, preferably at most 80 parts by weight, and more preferably at most 60 parts by weight. When the amount exceeds 120 parts by weight, besides dispersion into the rubber becomes difficult and heat generation is easily caused.

It is preferable that a silane coupling agent in combination with either one of the lamellar alumina powder (1) and the fluorine-containing mica (2) is added in the rubber composition for side reinforcement of the present invention.

Examples of the silane coupling agent are bis(3-triethoxysilylpropyl)tetrasulfide, bis(3-trimethoxysilylpropyl)tetrasulfide, bis(2-triethoxysilylpropyl)tetrasulfide, 3-mercaptopropyltriethoxysilane, and 2-mercaptoethyltrimethoxysilane, and these can be used alone or an arbitrary combination thereof can be used.

The amount of the silane coupling agent is preferably at least 2 parts by weight based on 100 parts by weight of the lamellar alumina powder (1) or the fluorine-containing mica (2), and further preferably at least 4 parts by weight. When the amount is less than 2 parts by weight, an effect by compounding the silane coupling agent is not adequately obtained. Further, the amount is preferably at most 20 parts by weight of the lamellar natural mineral and further preferably at most 15 parts by weight. When the amount exceeds 20 parts by weight, an effect to be obtained cannot be adequately obtained while cost is high.

As sulfur or a sulfur compound used in the present invention, insoluble sulfur is preferable from the viewpoint of suppressing the surface precipitation of sulfur.

The average molecular weight of the insoluble sulfur is preferably at least 10,000, and more preferably at least 100,000. When the average molecular weight is less than 10,000, decomposition at a low temperature is easily caused, and surface precipitation tends to easily occur. Further, the average molecular weight of the insoluble sulfur is preferably at most 500,000 and more preferably at most 300,000. When the average molecular weight exceeds 500,000, dispersibility into the rubber tends to be lowered.

The amount of the sulfur or sulfur compound is at least 2 parts by weight, and preferably at least 3 parts by weight. When the amount is less than 2 parts by weight, adequate hardness does not tend to be obtained. Further, the amount of the sulfur or sulfur compound is at most 10 parts by weight, and preferably at most 8 parts by weight. When the amount of the sulfur or sulfur compound exceeds 10 parts by weight, storage stability of an unvulcanized rubber tends to be damaged.

The rubber composition for side reinforcement of the present invention may contain zinc oxide, a wax, stearic acid, an oil, an antioxidant, a vulcanization accelerator and the like, which are used for general rubber compounding, within a range of not damaging the effect of the present invention There are various kinds of compounds used as the above-mentioned vulcanization accelerator, however among them, a sulfenamide accelerator is most often used as a delay vulcanization accelerator because scorch hardly occurs in a preparation process, and vulcanization property is excellent. Further, since the rubber compounding using the sulfenamide accelerator is low in exothermic property for deformation caused by an external force in physical properties of the rubber after vulcanization, the effect on durability improvement of the run flat tire which is the maximum purpose of the present invention is also significant.

Example of the sulfenamide accelerator are TBBS (N-tert-butyl-2-benzothiazolylsulfenamide), CBS (N-cyclohexyl-2-benzothiazolylsulfenamide), and DZ (N,N'-dicyclohexyl-2-benzothiazolylsulfenamide). As vulcanization accelerators other than the above, for example, MBT (mercaptobenzothiazole), MBTS (dibenzothiazyldisulfide), and DPG (diphenylguanidine) can be used.

In the rubber composition for side reinforcement of the present invention, strength at break ($T_B$) for physical properties after vulcanization is preferably at least 10 MPa, more preferably at least 12 MPa, and further preferably at least 14 MPa. When $T_B$ is less than 10 MPa, the rubber composition is broken during run flat running by bending due to the load of a vehicle, and run flat performance tends to be remarkably insufficient.

Further, the loss elastic modulus (E") and the complex elastic modulus (E*) of the rubber composition for side reinforcement of the present invention preferably satisfy the following formula:

$$E''/(E^*)^2 \leq 7.0 \times 10^{-9} Pa^{-1}$$

$E''/(E^*)^2$ is preferably $7.0 \times 10^{-9}$ Pa$^{-1}$, and more preferably $6.0 \times 10^{-9}$ Pa$^{-1}$. When $E''/(E^*)^2$ is larger than $7.0 \times 10^{-9}$ Pa$^{-1}$, heat generation by deformation at run flat is increased, and thermal degradation of a rubber tends to be accelerated to reach breaking.

EXAMPLES

The present invention is explained in detail based on Examples, but is not limited only thereto.

Various chemicals used in Examples are described in detail in the following.

NR: RSS#3
BR: VCR412 available from Ube Industries, Ltd. (amount ratio of syndiotactic-1,2-polybutadiene of 12% by weight).
Carbon black FEF: DIABLACK E available from Mitsubishi Chemical Corporation.
Lamellar alumina powder: SERATH YFA10030 (aspect ratio of 30, average particle diameter of 10 μm) available from KINSEIMATEC Co., Ltd.
Synthetic fluorine-containing mica: PDM-8W ($KMg_3AlSiO_3O_{10}F_2$, aspect ratio of 35, average particle diameter of 12 μm) available from Topy Industries Ltd.
Stearic acid: STEARIC ACID "TSUBAKI", available from NOF Corporation.
Zinc oxide: ZINC OXIDE NO.2 available from Mitsui Mining & Smelting Co., Ltd.
Antioxidant: ANTIGENE 6C available from Sumitomo Chemical Co., Ltd.
Silane coupling agent: Si-75 available from Degussa Japan Corporation.
Insoluble sulfur: MU-CRON OT available from Shikoku Chemicals Corporation.
Vulcanization accelerator: NOCCELER NS available from OUCHI SHINKO CHEMICAL INDUSTRIAL CO., LTD.

(Preparation of run flat tires of Examples 1 to 4 and Comparative Examples 1 to 8)

Components other than insoluble sulfur and a vulcanization accelerator were kneaded according to the compounding amount shown in Tables 1 and 2 at 150° C. for 4 minutes. Insoluble sulfur and the vulcanization accelerator were added to the obtained kneaded article and the mixture was kneaded at 80° C. for 3 minutes to obtain a rubber composition. Then, unvulcanized run flat tires in which lining strip layers comprising each obtained rubber composition were arranged as side reinforcing layers inside of the side walls were prepared, and run flat tires (tire size: 245/40ZR18) were prepared by vulcanizing the unvulcanized run flat tires.

The following measurements were carried out using the obtained run flat tires in Examples 1 to 4 and Comparative Examples 1 to 8.

<Aspect ratio of lamellar alumina powder or fluorine-containing mica in rubber composition>

Sheets with a thickness of 2 mm were cut out from the lining strip layers of the run flat tires, a lamellar alumina powder or synthetic fluorine-containing mica in the sheets was taken out by burning the sheets, 50 particles were arbitrarily selected by using an electron microscope, and a ratio of the maximum diameter based on a thickness was calculated by using an average thickness and an average maximum diameter obtained by measuring the particles.

<Strength at break $T_B$>

Sheets with a thickness of 2 mm were cut out from the lining strip layers of the run flat tires, and the evaluation of strength at break $T_B$ (MPa) was carried out according to JIS K6251.

<$E''/(E^*)^2$>

Sheets with a thickness of 2 mm were cut out from the lining strip layers of the run flat tires, and loss elastic modulus E" and complex elastic modulus E* were measured at a measurement temperature of 70° C. with an initial strain of 10%, a dynamic strain of ±1% and a frequency of 10 Hz using a viscoelastic spectrometer manufactured by Iwamoto Seisakusyo K.K. to calculate $E''/(E^*)^2$.

<Run flat performance>

A vehicle ran on a drum at a speed of 80 km/h at an air inner pressure of 0 kPa using the run flat tires, and running distances until the tires were broken were compared. Then, respective values were expressed as indices by referring to Comparative Example 1 as the basis (100) in Table 1, and by referring to Comparative Example 5 as the basis (100) in Table 2.

It is indicated that the larger the value is, the more excellent the run flat durability is.

Respective evaluation results are shown in Tables 1 and 2.

TABLE 1

|  | Ex. | | Com. Ex. | | | |
| --- | --- | --- | --- | --- | --- | --- |
|  | 1 | 2 | 1 | 2 | 3 | 4 |
| Composition (parts by weight) | | | | | | |
| NR | 70 | 70 | 70 | 70 | 70 | 70 |
| BR | 30 | 30 | 30 | 30 | 30 | 30 |
| Carbon black | 50 | 50 | 65 | 5 | 62 | 50 |
| Lamellar alumina powder | 15 | 30 | — | 80 | 3 | 15 |
| Stearic acid | 2 | 2 | 2 | 2 | 2 | 2 |
| Zinc oxide | 3 | 3 | 3 | 3 | 3 | 3 |
| Antioxidant | 1 | 1 | 1 | 1 | 1 | 1 |
| Insoluble sulfur | 5 | 5 | 5 | 5 | 5 | 1.8 |
| Vulcanization accelerator | 2 | 2 | 2 | 2 | 2 | 1.4 |
| The aspect ratio of lamellar alumina powder in rubber composition | 30 | 30 | 30 | 30 | 30 | 30 |
| Evaluation results | | | | | | |
| $T_B$[MPa] | 14.3 | 14.1 | 14.6 | 7.9 | 14.3 | 14.9 |
| $E''/(E^*)^2 [10^{-9} Pa^{-1}]$ | 6.3 | 5.6 | 7.7 | 6.5 | 7.6 | 8.6 |
| Run flat performance | 140 | 171 | 100 | 44 | 100 | 61 |

TABLE 2

|  | Ex. | | Com. Ex. | | | |
| --- | --- | --- | --- | --- | --- | --- |
|  | 3 | 4 | 5 | 6 | 7 | 8 |
| Composition (parts by weight) | | | | | | |
| NR | 70 | 70 | 70 | 70 | 70 | 70 |
| BR | 30 | 30 | 30 | 30 | 30 | 30 |
| Carbon black | 50 | 50 | 65 | 5 | 62 | 50 |
| Synthetic fluorine-containing mica | 15 | 30 | — | 75 | 3 | 30 |
| Stearic acid | 2 | 2 | 2 | 2 | 2 | 2 |
| Zinc oxide | 3 | 3 | 3 | 3 | 3 | 3 |
| Antioxidant | 1 | 1 | 1 | 1 | 1 | 1 |
| Silane coupling agent | 3 | 3 | — | — | 0.4 | 3 |
| Insoluble sulfur | 5 | 5 | 5 | 5 | 5 | 1.8 |
| Vulcanization accelerator | 2 | 2 | 2 | 2 | 2 | 1.4 |
| The aspect ratio of Synthetic fluorine-containing mica in rubber composition | 35 | 35 | 35 | 35 | 35 | 35 |
| Evaluation results | | | | | | |
| $T_B$[MPa] | 14.6 | 15.1 | 14.7 | 7.9 | 13.8 | 14.6 |
| $E''/(E^*)^2 [10^{-9} Pa^{-1}]$ | 5.3 | 4.2 | 4.8 | 4.4 | 7.4 | 8.8 |
| Run flat performance | 169 | 201 | 100 | 46 | 100 | 62 |

According to the present invention, a rubber composition for reinforcing a side of a run flat tire having low exothermic property as well as high hardness can be provided by compounding specific carbon black, sulfur or a sulfur compound, and either of (1) a lamellar alumina powder or (2) fluorine-containing mica. Further, run flat durability thereof can be improved by using the rubber composition as a side reinforcing layer of a run flat tire.

What is claimed is:

1. A rubber composition for reinforcing a side of a run flat tire, comprising:
   10 to 100 parts by weight of carbon black having a nitrogen adsorbing-specific area of 30 to 100 m²/g and a dibutyl phthalate oil absorption amount of at least 50 ml/100 g,
   at least 2 parts by weight of sulfur or a sulfur compound, and
   5 to 120 parts by weight of a lamellar alumina powder having an aspect ratio of 3 to 50 and an average particle diameter of 5 to 30 µm based on 100 parts by weight of a diene rubber component.

2. A rubber composition for reinforcing a side of a run flat tire, comprising:
   10 to 100 parts by weight of carbon black having a nitrogen adsorbing-specific area of 30 to 100 m²/g and a dibutyl phthalate oil absorption amount of at least 50 ml/100 g,
   at least 2 parts by weight of sulfur or a sulfur compound, and
   5 to 120 parts by weight of fluorine-containing mica having an aspect ratio of 3 to 50 based on 100 parts by weight of a diene rubber component.

3. A run flat tire having a reinforcing layer disposed on the side thereof and inside a tire carcass ply, wherein said reinforcing layer is formed from the rubber composition according to claim 1.

4. A run flat tire having a reinforcing layer disposed on the side thereof and inside a tire carcass ply, wherein said reinforcing layer is formed from the rubber composition according to claim 2.

5. The run flat tire of claim 3, wherein the lamellar alumina powder is present in an amount of 15 to 60 parts by weight, has an aspect ratio of 10 to 40, and an average particle diameter of 10 to 20 µm.

6. The run flat tire of claim 4, wherein the fluorine-containing mica is represented by the following formula:

$$X_{1/3 \text{ to } 1}Y_{2 \text{ to } 3}(Z_4O_{10})F_{1.5 \text{ to } 2}$$

wherein X represents one kind of ion selected from the group consisting of $Na^+$, $K^+$, $Li^+$, $Ca^{2+}$, $Rb^{2+}$ and $Sr^{2+}$, Y represents one kind of ion selected from the group consisting of $Mg^{2+}$, $Fe^{2+}$, $Ni^{2+}$, $Mn^{2+}$, $Al^{3+}$, $Fe^{3+}$ and $Li^+$, and Z represents one kind of ion selected from the group consisting of $Al^{3+}$, $Si^{4+}$, $Ce^{4+}$, $Fe^{3+}$ and $B^{3+}$.

7. The run flat tire of claim 6, wherein the fluorine-containing mica is selected from the group consisting of $KMg_3AlSiO_3O_{10}F_2$, $KMg_{2.5}Si_4O_{10}F_2$, $NaMg_{2.5}Si_4O_{10}F_2$, $NaMg_2LiSi_4O_{10}F_2$ and $LiMg_2LiSi_4O_{10}F_2$.

8. The run flat tire of claim 6, wherein the fluorine-containing mica is present in an amount of 15 to 60 parts by weight, has an aspect ratio of 10 to 30, and an average particle diameter of 10 to 20 µm.

9. The run flat tire of claim 7, wherein the fluorine-containing mica is present in an amount of 15 to 60 parts by weight, has an aspect ratio of 10 to 30, and an average particle diameter of 10 to 20 µm.

* * * * *